United States Patent
Wismann et al.

(10) Patent No.: US 12,428,094 B2
(45) Date of Patent: Sep. 30, 2025

(54) VEHICLE CONTROLLER, VEHICLE INCLUDING A VEHICLE CONTROLLER, AND METHOD OF OPERATING A VEHICLE

(71) Applicant: Zero Motorcycles, Inc., Scotts Valley, CA (US)

(72) Inventors: Brian Wismann, Felton, CA (US); Will Brunner, Scotts Valley, CA (US); Akshay Agrawal, San Jose, CA (US); Abe Askenazi, Scotts Valley, CA (US); Christopher Metcalfe, Santa Cruz, CA (US); Joanne Ignacio, Fremont, CA (US); Dean Pryce, santa Cruz, CA (US)

(73) Assignee: ZERO MOTORCYCLES, INC., Scotts Valley, CA (US)

( * ) Notice: Subject to any disclaimer, the term of this patent is extended or adjusted under 35 U.S.C. 154(b) by 909 days.

(21) Appl. No.: 17/518,567

(22) Filed: Nov. 3, 2021

(65) Prior Publication Data

US 2023/0139530 A1    May 4, 2023

(51) Int. Cl.
  *B62K 11/14*    (2006.01)
  *B60L 15/20*    (2006.01)
  *B62K 23/06*    (2006.01)

(52) U.S. Cl.
  CPC .......... *B62K 11/14* (2013.01); *B60L 15/2063* (2013.01); *B60L 15/2072* (2013.01);
  (Continued)

(58) Field of Classification Search
  CPC ............. B60L 15/2063; B60L 15/2072; B60L 2200/12; B60L 2240/12; B60L 2240/32
  See application file for complete search history.

(56) References Cited

U.S. PATENT DOCUMENTS 4,583,613 A    4/1986 Nakayama
5,024,113 A    6/1991 Ito et al.
(Continued)

FOREIGN PATENT DOCUMENTS

EP    3744560 A1 *  12/2020  .............. B60L 50/50
JP    H06156307 A *  6/1994
(Continued)

OTHER PUBLICATIONS

Shah, Pradeep, "TVS electric scooters to come with parking assist: How this technology can be a game changer, especially in India!" Express Drives (Apr. 15, 2018) (Accessed Sep. 15, 2021), pp. 1-8.
(Continued)

*Primary Examiner* — Jacob D Knutson
(74) *Attorney, Agent, or Firm* — Carter, DeLuca & Farrell LLP

(57) ABSTRACT

A vehicle, e.g., a two-wheeled electric vehicle, is operable in a low-speed mode, in which the vehicle can be propelled selectively in the forward or reverse direction, at a speed limited to approximately an average person's walking speed, e.g., approximately 3 mph. The amount of torque driving the vehicle is controlled so that higher torque is available to propel the vehicle at lower speeds and lower torque is available to propel the vehicle at higher speeds. The maximum torque of the vehicle's electric motor is available to propel the vehicle at a standstill.

20 Claims, 11 Drawing Sheets

(52) U.S. Cl.
CPC .......... *B62K 23/06* (2013.01); *B60L 2200/12* (2013.01); *B60L 2240/12* (2013.01); *B60L 2240/32* (2013.01); *B62K 2204/00* (2013.01)

(56) References Cited

U.S. PATENT DOCUMENTS

| | | | | |
|---|---|---|---|---|
| 8,783,405 | B2* | 7/2014 | Irie | B62K 11/04 |
| | | | | 180/312 |
| 8,833,495 | B2* | 9/2014 | Iwata | B60K 1/04 |
| | | | | 180/68.5 |
| 8,954,212 | B2 | 2/2015 | Hatanaka et al. | |
| 8,957,618 | B2 | 2/2015 | Tadano et al. | |
| 9,381,810 | B2* | 7/2016 | Nelson | F02D 11/105 |
| 9,963,044 | B2 | 5/2018 | Koizumi | |
| 10,457,288 | B2 | 10/2019 | Takayanagi et al. | |
| 10,800,489 | B2 | 10/2020 | Takayanagi et al. | |
| 2006/0251946 | A1 | 11/2006 | Makuta et al. | |
| 2009/0127060 | A1 | 5/2009 | Ishida | |
| 2012/0138375 | A1 | 6/2012 | Hughes | |
| 2020/0010065 | A1 | 1/2020 | Books et al. | |

FOREIGN PATENT DOCUMENTS

| | | |
|---|---|---|
| WO | 2018/065893 A1 | 4/2018 |
| WO | 2019/190389 A1 | 10/2019 |
| WO | 2020/065675 A1 | 4/2020 |

OTHER PUBLICATIONS

"Technology" Energica (Accessed Sep. 15, 2021), https://www.energicamotorusa.com/technology, pp. 1-6.

International Report on Patentability issued in corresponding International Application No. PCT/US2022/048551 dated May 2, 2024, pp. 1-7.

Castelvecchi, D., "Electric cars and batteries: how will the world produce enough?" Nature (Aug. 2021) pp. 336-339, vol. 596.

International Search Report and Written Opinion issued in corresponding International Application No. PCT/US22/48551, dated Mar. 24, 2023.

Extended European Search Report issued by the European Patent Office on Sep. 1, 2025 in corresponding EP Patent Application No. 22890673.1.

* cited by examiner

VEHICLE CONTROLLER, VEHICLE INCLUDING A VEHICLE CONTROLLER, AND METHOD OF OPERATING A VEHICLE

FIELD OF THE INVENTION

The present invention relates to a vehicle controller, a vehicle including a vehicle controller, and a method of operating a vehicle.

BACKGROUND INFORMATION

Many vehicles, for example, automobiles, with a multi-gear transmission include a reverse gear for propelling the vehicle in a reverse direction. In vehicles driven by an internal combustion engine, engine torque typically increases from idle speed, reaches a maximum, and then decreases as engine speed reaches its upper limit. Consequently, a vehicle driven by an internal combustion engine may exhibit a relatively low driving torque at low engine speeds and drastically higher driving torque with increasing engine speed followed by a precipitous reduction in driving torque at even higher engine speeds. This characteristic can lead to dangerous operating conditions in instances where, for example, an obstacle interferes with the driver's ability to propel the vehicle in the reverse direction. If, when faced with such an obstacle at a very low vehicle speed, the driver further depresses the accelerator to overcome the obstacle, the torque response of the engine may result in a disproportionate increase in driving torque, causing the vehicle to hurtle unexpectedly in the reverse direction. A similar effect can occur when driving in the lowest forward gear. Given the configuration and constraints of an internal combustion engine and its transmission, it is not possible to modify the vehicle's torque-engine speed relationship during operation of the vehicle.

While certain motorcycles or other two-wheeled vehicles may include a reverse gear, many do not. Thus, in motorcycles that lack a reverse gear, the driver must manually walk or push the motorcycle in the rearward direction. In motorcycles that include a reverse gear, it is awkward and difficult to maneuver the motorcycle in the rearward direction, since the driver may have to simultaneously operate the clutch lever, located on the left-hand side of the handlebar, the throttle, located on the right-hand side of the handlebar, the front brake lever, also located on the right-hand side of the handlebar, the rear brake pedal, located on the right-hand side of the motorcycle, and the gear-change lever, located on the left-hand side of the motorcycle, all while steering with the handlebar and turning their upper body to look rearward.

Certain motorcycles lack a reverse gear but can be propelled in the rearward direction by operating the starter motor in a special reverse mode. However, since starter motors are not typically designed for propelling a vehicle, employing a starter motor as a reversing mechanism may result in excessive or premature wear and failure of the starter motor. Additionally, starter motors are generally designed to operate in short bursts, providing high torque at the engine's minimum cranking speed. This high torque requires significant battery power consumption. Thus, utilizing a vehicle's starter motor for propulsion may overly tax the vehicle's battery and other electrical systems and may overheat the motor, resulting in premature failure.

There is believed to be a need to provide for operation of a two-wheeled electric vehicle in a low-speed mode, in which the maximum driven speed of the vehicle is significantly below the normal driving speed and the maximum driven speed of the vehicle, e.g., to assist the driver of the vehicle in parking, maneuvering in tight spaces, in overcoming obstacles, etc.

SUMMARY

According to an example embodiment of the present invention, a system for a wheeled vehicle includes: an electric motor adapted to drive at least one wheel of the vehicle to propel the vehicle, the electric motor having a predetermined maximum torque output; an energy storage device adapted to supply electrical energy to the electric motor; and a controller adapted to control the supply of electrical energy to the electric motor to control an amount of torque output by the electric motor. The controller is adapted to selectively operate the vehicle in a low-speed mode to limit a driven speed of the vehicle to a maximum driven speed that is below a maximum speed of the vehicle, and the controller adapted to control the amount of torque output by the electric motor in the low-speed mode according to an inverse relationship between the amount of torque output by the electric motor and the driven speed of the vehicle. Additionally, the controller is adapted to control the amount of torque output by the electric motor in the low-speed mode toward the predetermined maximum torque output of the electric motor at a zero vehicle speed and to reduce the amount of torque output by the electric motor in the low-speed mode with increasing vehicle speed.

The controller may be adapted to selectively propel the vehicle in a forward direction and in a rearward direction in the low-speed mode.

The controller may be adapted to switch between propulsion of the vehicle in the forward direction and in the rearward direction.

The system may include at least one user-operable control component, and the controller may be adapted to switch between propulsion of the vehicle in the forward direction and in the rearward direction in response to operation of the user-operable control component.

The system may include a display device adapted to display a visual indication that the controller is operating the vehicle in the low-speed mode.

The controller may be adapted to selectively operate the vehicle in the low-speed mode in response to a predetermined sequence of operation of components of the vehicle.

The controller may be adapted to prevent activation of the low-speed mode unless a predetermined set of conditions is satisfied.

The predetermined set of conditions may include a kickstand of the vehicle being in a lowered position and a speed of the vehicle being zero.

The maximum driven speed of the vehicle in the low-speed mode may be approximately 3 mph.

The user-operable control component may include a front brake lever of the vehicle.

The user-operable control component may include a front brake lever located on a right side of a handlebar of the vehicle and a further control component located on the right side of the handlebar of the vehicle, and the controller adapted to switch between propulsion of the vehicle in the forward direction and in the rearward direction in response to simultaneous operation of the front brake lever and the further control component.

The further control component may include a button and/or a switch.

The controller may be adapted to switch between propulsion of the vehicle in the forward direction and in the rearward direction in response to simultaneous operation of the front brake lever and the further control component for a predetermined length of time.

The controller may be adapted to selectively propel the vehicle in a forward direction and in a rearward direction in the low-speed mode by controlling a rotational direction of the electric motor.

The electric motor may be arranged as three-phase AC motor.

The controller may be adapted to control the amount of torque output by the electric motor in the low-speed mode by controlling a current, voltage, and/or frequency of the electrical energy supplied to the electric motor from the energy storage device.

The energy storage device may include a battery.

The battery may be arranged as a lithium ion battery.

The vehicle may be arranged as an electric motorcycle.

According to an example embodiment of the present invention, a two-wheeled vehicle includes: a front wheel; a rear wheel; an electric motor adapted to drive at least one of the wheels to propel the vehicle, the electric motor having a predetermined maximum torque output; a battery adapted to supply electrical energy to the electric motor; and a controller adapted to control the supply of electrical energy to the electric motor to control an amount of torque output by the electric motor. The controller is adapted to selectively operate the vehicle in a low-speed mode to limit a driven speed of the vehicle to a maximum driven speed that is below a maximum speed of the vehicle, and the controller adapted to control the amount of torque output by the electric motor in the low-speed mode according to an inverse relationship between the amount of torque output by the electric motor and the driven speed of the vehicle. Additionally, the controller is adapted to control the amount of torque output by the electric motor in the low-speed mode toward the predetermined maximum torque output of the electric motor at a zero vehicle speed and to reduce the amount of torque output by the electric motor in the low-speed mode with increasing vehicle speed.

Further features and aspects of example embodiments of the present invention are described in more detail below with reference to the appended schematic Figures.

DETAILED DESCRIPTION

Figure 1:
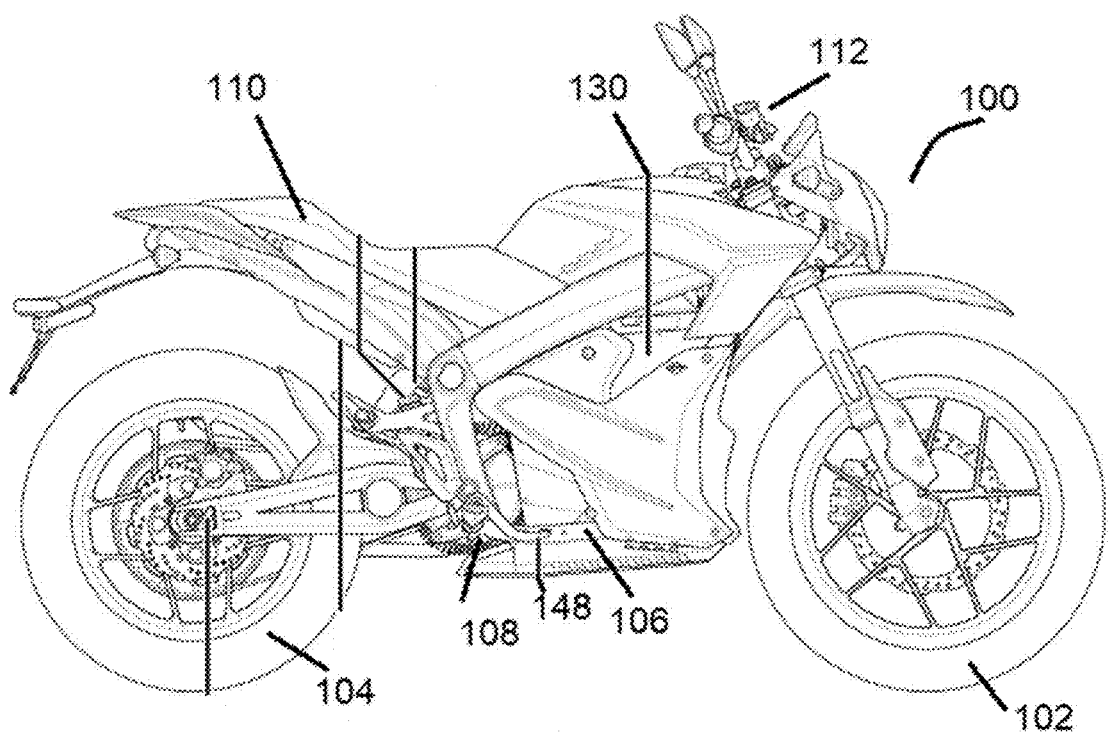
FIG. 1 is a schematic right side view of a two-wheeled vehicle according to an example embodiment of the present invention.
Figure 2:
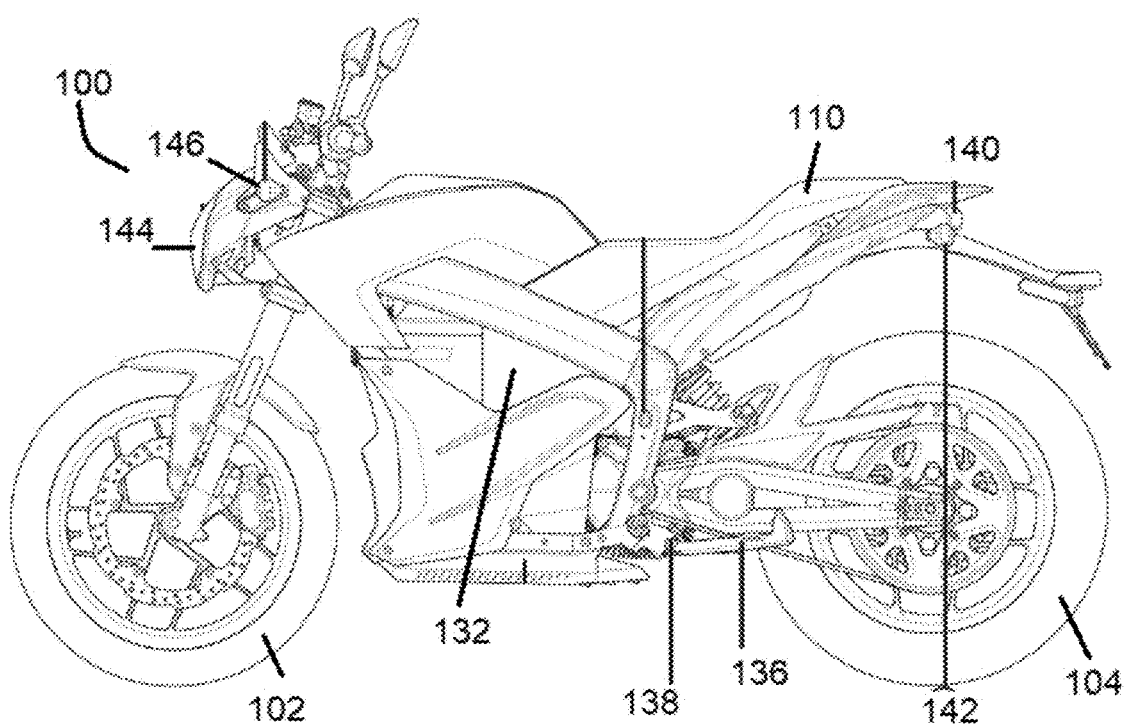
FIG. 2 is a schematic left side view of the vehicle.

FIG. 1 is a schematic side view of a two-wheeled vehicle 100, e.g., a motorcycle, according to an example embodiment of the present invention, and FIG. 2 is a schematic left side view of the vehicle 100 illustrated in FIG. 1. As illustrated in FIGS. 1 and 2, the vehicle 100 is arranged as an electric motorcycle and includes a controller 130, a front wheel 102, a rear wheel 104, and electric motor 108, e.g., an air-cooled, brushless, permanent-magnet 3-phase AC motor, powered by an energy storage device 132, e.g., a battery, a lithium ion battery, an integrated battery, a hot-swappable battery, etc., to drive the rear wheel 104 to thereby propel the vehicle 100 according to the driver's operation thereof. Since the vehicle 100 is arranged as an electric vehicle, e.g., an electric motorcycle, it lacks an internal combustion engine and associated transmission, and its only source of propulsion is electric motor 108. The electric motor 108 may be driven in either rotational direction to thereby selectively propel the vehicle 100 in the forward direction or the reverse direction, depending on the rotational direction of the electric motor 108. In other words, the driving direction of the vehicle 100 does not rely on the engagement of particular gears or on the use of a transmission. The motor 108 may be arranged as a direct drive motor, adapted to drive the rear wheel 104 via a belt, chain, or driveshaft.

While the vehicle 100 is described above as being an electric vehicle (EV), the vehicle 100 may be arranged as a hybrid electric vehicle (HEV), a plug-in hybrid electric vehicle (PHEV), etc.

The vehicle 100 includes a seat 110 to accommodate the driver, and, optionally, a passenger, and a handlebar 112 that includes controls for the driver to operate the vehicle 100, as described in more detail below. The front wheel 102, the rear wheel 104, the motor 108, and the battery 132, for example, are mounted to frame 106.

The vehicle 100 further includes a kickstand 136 that can be retracted, e.g., raised, for normal driving, or extended, e.g., lowered, to support the vehicle 100 when parked. A kickstand sensor 138 detects whether the kickstand 136 is in the retracted or extended position and is arranged as a safety feature to prevent operation, e.g., propulsion, of the vehicle 100 if the kickstand 136 is in the extended, e.g., lowered, position.

Moreover, the vehicle 100 includes a brake light 140, which is normally illuminated when the front brake lever 120 and/or the rear brake pedal 148 is operated to engage the vehicle's brakes, rear turn signals 142 and front turn signals 146, which are normally illuminated, e.g., blink, when the driver operates the vehicle's turn signal switch to indicate their intention to make a left-hand or right-hand turn or lane change, and a headlight 144, which is normally illuminated during regular driving operation of the vehicle 100, e.g., as a daytime running light.

Figure 3:
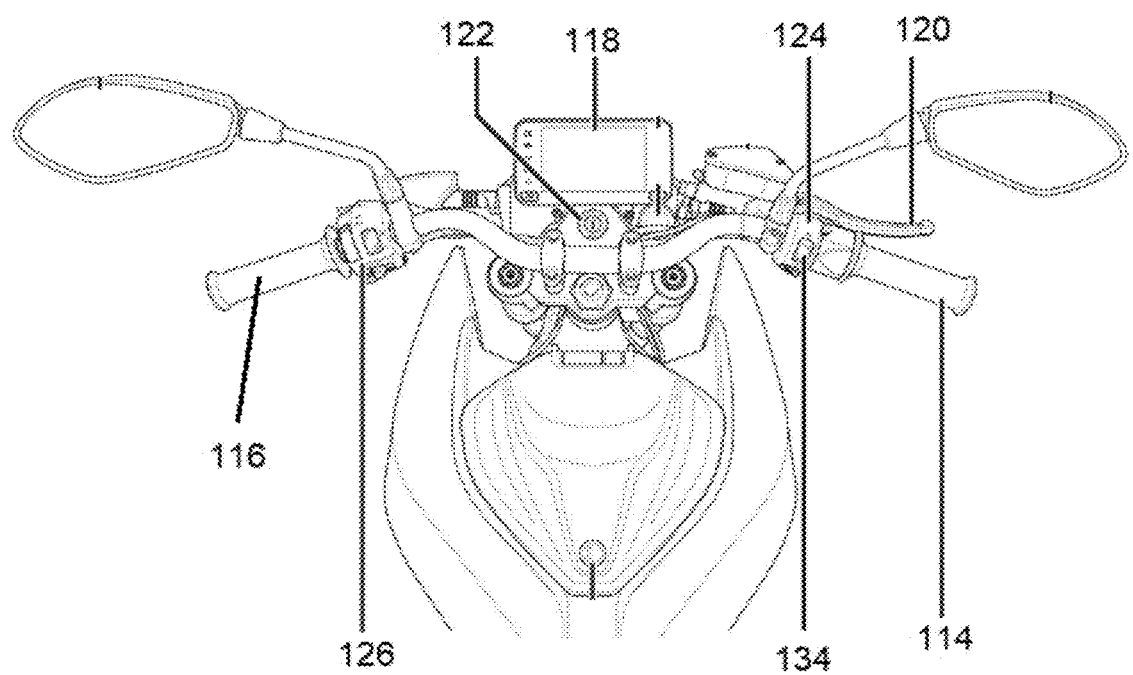
FIG. 3 schematically illustrates the controls of the vehicle.

FIG. 3 schematically illustrates the controls of the vehicle 100 illustrated in FIGS. 1 and 2. Mounted on the handlebar 112 are right handgrip 114, which includes the vehicle's throttle/accelerator, left handgrip 116, front brake lever 120, key switch 122, which may also include a steering lock feature, right switchgear 124, and left switchgear 126. Additionally, a dash display 118 is provided and may be arranged as a display, e.g., an LCD panel, a touch screen, etc.

Figure 4:
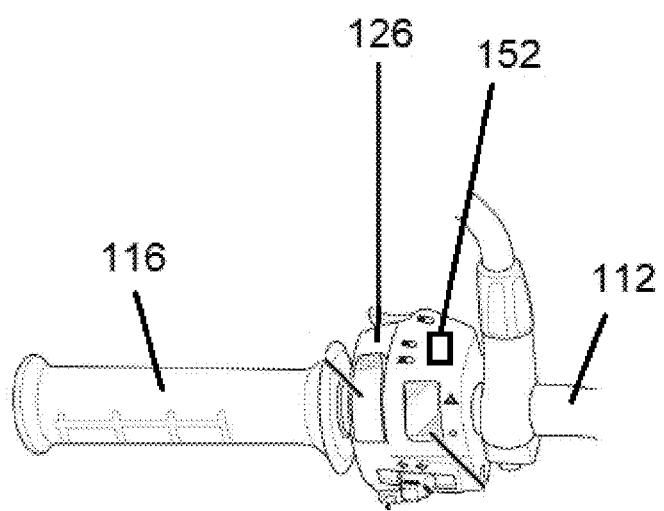
FIG. 4 is a schematic view of the left-hand controls of the vehicle.
Figure 5:
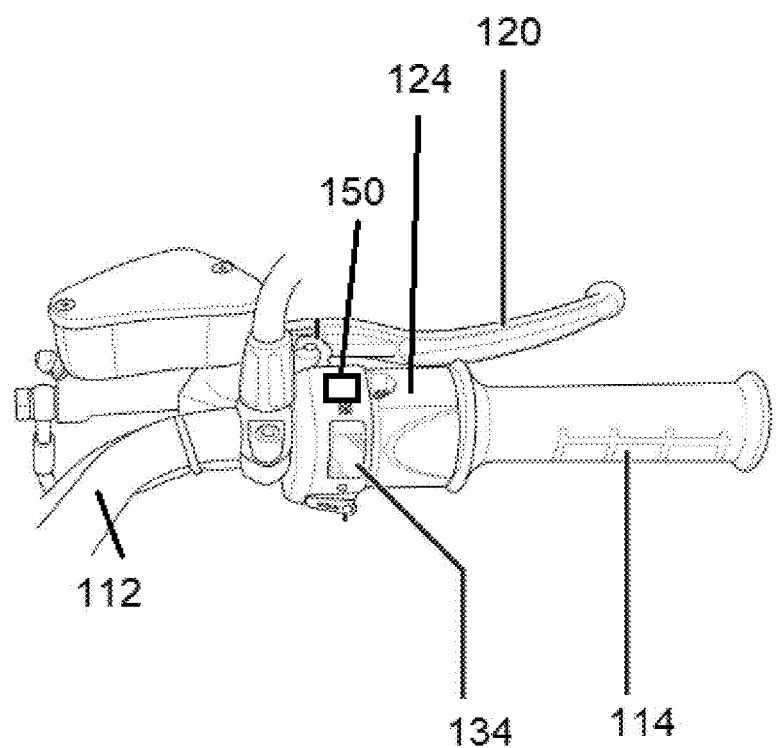
FIG. 5 is a schematic view of the right-hand controls of the vehicle.

FIG. 4 is a schematic view of the left-hand controls of the vehicle 100, and FIG. 5 is a schematic view of the right-hand controls of the vehicle 100. As mentioned above, the left-hand controls include left handgrip 116 and left switchgear 126, and the right-hand control include right handgrip 114, front brake lever 120, and right switchgear 124. The left switchgear 126 may include a number of operating components for operating or controlling associated vehicle systems or features, including, for example, switches to operate the vehicle's headlight 144, to switch between high and low beams of the headlight 144, to operate the headlight 144 on a flash-to-pass basis, a switch to operate the turn signals 142, 146 as hazard warning flashers, a turn signal switch to operate the turn signals 142 and 146 as flashing indicators to reflect the driver's intention to make a turn, e.g., at an intersection, or to change lanes, a button to operate the vehicle's horn, a mode switch 152 to change operating modes of the vehicle 100, etc. The right switchgear 124 may also include a number of operating components for operating or controlling associated vehicle systems or features, including, for example, a motor start stop switch 134, a cruise control switch 150 for operating the vehicle's cruise control feature, etc.

The motor start stop switch 134 may be arranged as a rocker or toggle switch having two operating positions: a start position and a stop position. In the stop position, also referred to as the OFF or kill position, the motor start stop switch 134 switches off power to the motor 108, to prevent the motor 108 from propelling the vehicle 100, and in the start position, also referred to as the ON or run position, switches on power to the motor 108, to allow the motor 108 to propel the vehicle 100. It should be appreciated that the start stop switch 134 does not turn off (or on) power to other circuits of the vehicle 100. Rather, the key switch 122 may operate as a main power switch, powering off most, or all, circuits of the vehicle 100 in the OFF position and powering on most, or all, circuits of the vehicle 100 in the ON position.

Figure 6:
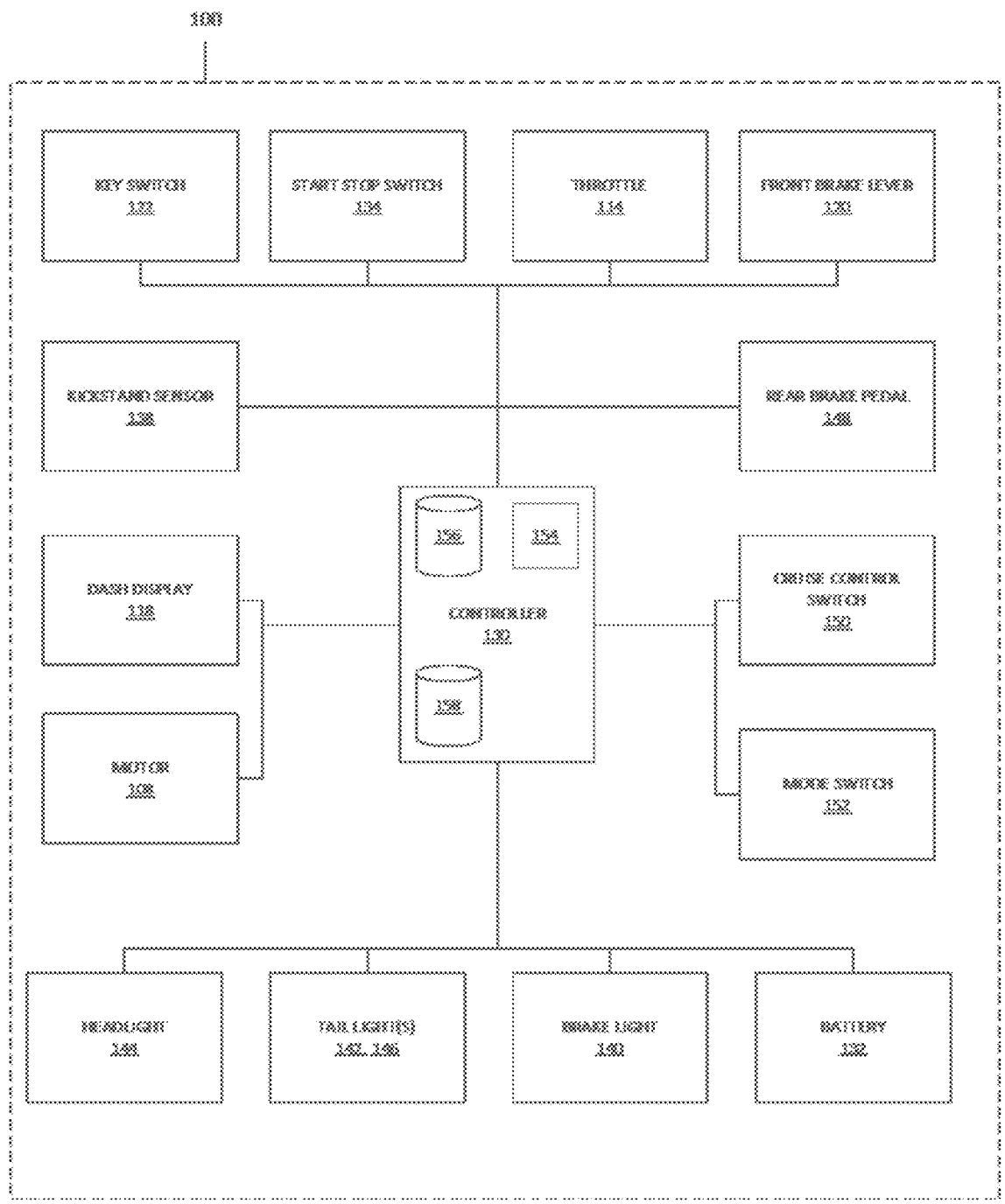
FIG. 6 is a schematic block diagram of the vehicle.

FIG. 6 is a schematic block diagram of vehicle 100. As illustrated in FIG. 6, the controller 130 may include one or more electronic control units (ECUs), microprocessors, memory units (e.g., non-volatile memory units, volatile memory units, firmware, and/or non-transitory storage devices) adapted to store data and control instructions and/or software for operation of the vehicle 100, other hardware or logic circuitry, etc. The controller 130 may be arranged as a single, integrated unit, e.g., integrated with the dash display 118, or it may be arranged as a plurality of sub-units distributed throughout the vehicle 100. FIG. 6 schematically illustrates the controller 130 as including a processor, a microprocessor, other logic unit(s), circuitry, hardware, and/or firmware, collectively indicated by reference numeral 154, memory unit(s) 156, and software 158, e.g., stored in a non-transitory computer readable storage medium as a set of instructions that are executable by a processor. For example, the controller 130 may include microprocessor adapted to execute the set of instructions stored in the non-transitory computer readable storage medium to perform the processes described herein.

As illustrated in FIG. 6, controller 130 is connected to and in communication with, for example, motor 108, throttle 114, dash display 118, front brake lever 120, key switch 122, battery 132, start stop switch 134, kickstand sensor 138, brake light 140, headlight 144, taillights 142, 146, rear brake pedal 148, cruise control switch 150, and mode switch 152. While FIG. 6 illustrates a direction connection between controller 130 and the foregoing components of the vehicle 100, it should be appreciated that the controller 130 and the foregoing components of the vehicle 100 may be indirectly connected and may indirectly communication with each other via, for example, one or more buses of the vehicle 100, e.g., a CAN bus. Moreover, while FIG. 6 illustrates controller 130 being connected to and in communication with all of the foregoing components of the vehicle 100, it should be appreciated that a subset of those components may be connected to and in communication with the controller 130.

The controller 130 may be adapted to enter a low-speed mode, referred to, for example, as a creep mode or park mode, in which the speed that the vehicle 100 is propelled is limited to that which is similar to a walking speed, e.g., approximately 3 mph, e.g., between 2.5 and 3.5 mph, between 2 and 4 mph, between 1 and 5 mph, etc. Thus, for example, the speed limit in the low-speed mode is significantly below the normal operating speeds of the vehicle 100, e.g., 20 to 60 mph, and its top speed, e.g., 80 to 130 mph.

The controller 130 may be adapted to require a particular and specific sequence of operations of one or more of the operational components of the vehicle 100 in order to enter or engage the low-speed mode. This requirement may avoid or at least reduce or minimize the possibility of entering or engaging the low-speed mode accidentally or unintentionally.

This is particularly important when the vehicle 100 is at a standstill, since entering or engaging the low-speed mode accidentally or unintentionally could cause damage to the driver, pedestrians, the vehicle 100, other property, etc.

Figure 7A:
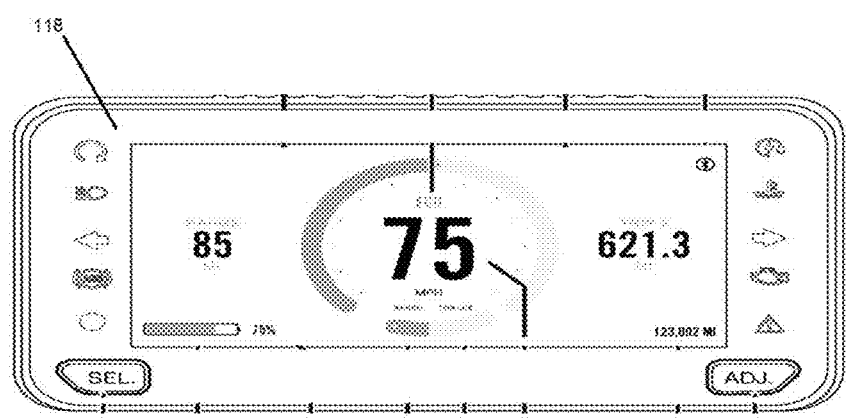
FIGS. 7a to 7d schematically illustrate a dash display of the vehicle in corresponding operating modes of the vehicle.

For example, entering or engaging the low-speed mode may require the operator of the vehicle 100 to navigate through one or more on-screen menus presented on the dash display 118. Once the low-speed mode is engaged, the dash display 118 switches from its normal operating mode, schematically illustrated in FIG. 7a, in which, for example, vehicle speed, odometer, trip odometer, vehicle range, etc., may be displayed to the driver, to low-speed mode displays, schematically illustrated in FIGS. 7b and 7c. In the low-speed driving mode, the dash display 118 may present limited information to the driver, to highlight that the vehicle 100 is in the low-speed mode and to minimize distractions to the driver. While in the low-speed mode, the vehicle 100 may be selectively driven in the reverse or forward direction, and the driver of the vehicle 100 may toggle between the reverse and forward directions, as described in more detail below. When first entering the low-speed mode, the controller 130 may be adapted to cause the motor 108 to propel the vehicle 100 in the reverse direction, based on the assumption that the driver would most likely utilize the low-speed mode for backing up the vehicle 100. However, the controller 130 may be adapted to cause the motor 108 to propel the vehicle 100 in the forward direction upon first entering the low-speed mode. The driving direction, as noted above, depends on the rotational direction of the motor 108.

Figure 7B:
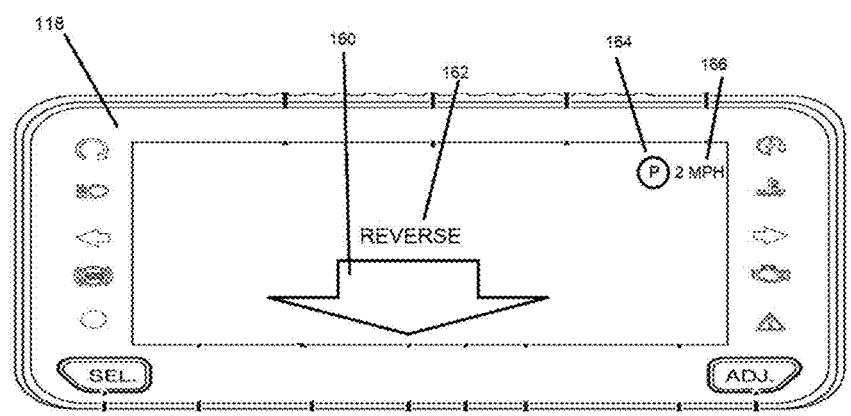
Figure 7C:
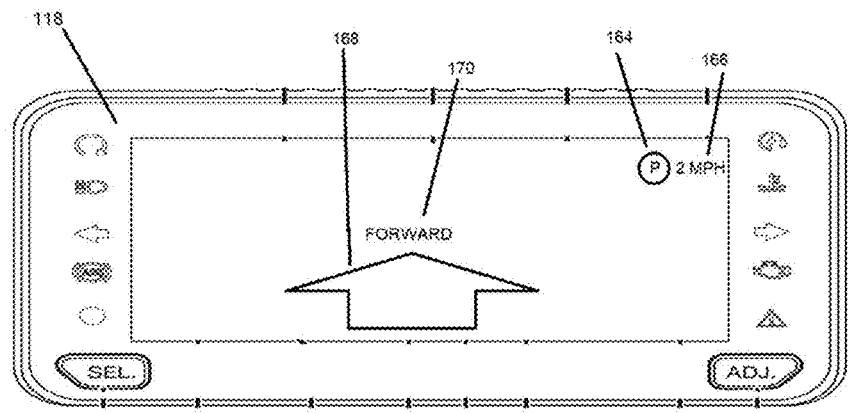

For example, as illustrated in FIG. 7b, while in the low-speed mode, the dash display 118 may prominently display an arrow 160 pointing rearward along with the text "REVERSE" 162, to indicate to the driver of the vehicle 100 that the vehicle will be propelled in the rearward driving direction, and as illustrated in FIG. 7c, while in the low-speed mode, the dash display 118 may prominently display an arrow 168 pointing forward along with the text "FORWARD" 170, to indicate to the driver of the vehicle 100 that the vehicle will be propelled in the forward driving direction. Thus, the driver of the vehicle 100 may quickly and readily ascertain the driving direction of the vehicle 100 by looking at the dash display 118. Additionally, as illustrated in FIGS. 7b and 7c, while the vehicle is in the low-speed mode, the dash display 118 may include a symbolic indication 164 to indicate to the driver of the vehicle 118 that the vehicle 100 is in the low-speed mode. As an example, the symbolic indication 164 may be the letter "P" enclosed in a circle. Additionally, as illustrated in FIGS. 7b and 7c, the driving speed 166 of the vehicle 100 may be indicated. If the dash display 118 is implemented as a touch screen, the driver of the vehicle 100 may toggle between the reverse and forward driving directions by pressing or tapping on a designated area of the dish display 118, e.g., in the vicinity of the arrow 160 or 168 and/or text 162 or 170. The driver of the vehicle 100 may operate one of the other operating controls, e.g., the cruise control switch 150, to toggle between the reverse and forward driving directions. For example, while the low-speed mode is engaged to propel the vehicle 100 in the reverse direction, a short press, e.g., a press for less than one second, of the operating control, e.g., the cruise control switch 150, toggles the low-speed mode to the forward driving direction, and while the low-speed mode is engaged to propel the vehicle 100 in the forward direction, a short press, e.g., a press for less than one second, of the operating control, e.g., the cruise control switch 150, toggles the low-speed mode to the reverse driving direction. Thus, the driver of the vehicle 100 may quickly and readily toggle between the driving directions. In addition to the dash display screens illustrated in FIGS. 7b and 7c, the dash display 118 may display the screen illustrated in FIG. 7d upon initial entry into the low-speed mode but before the vehicle 100 is in condition to be driven, as described in more detail below.

In addition, or as an alternative, to entering or engaging the low-speed mode by navigating through a menu structure on the dash display 118, the low-speed mode may be entered or engaged by operating certain vehicle controls in a particular sequence. For example, the driver of the vehicle 100 may enter or engage the low-speed mode in the condition that the vehicle 100 is stopped, and upon initial activation of the low-speed mode, the vehicle 100 may be driven in the reverse direction up to the maximum low-speed limit of, for example, approximately 3 mph, e.g., between 2.5 and 3.5 mph, between 2 and 4 mph, between 1 and 5 mph, etc. As a further example, the driver of the vehicle 100 may enter or engage the low-speed mode by operating a dedicated or multi-function switch, button, other control device, e.g., located on or at the handlebar 112, in, on, or at the switchgear 124, 126, on or at the dash of the vehicle 100, etc. The driver may selectively switch or toggle between the reverse and forward driving directions, and the driver may selectively exit the low-speed mode at any time.

Figure 8:
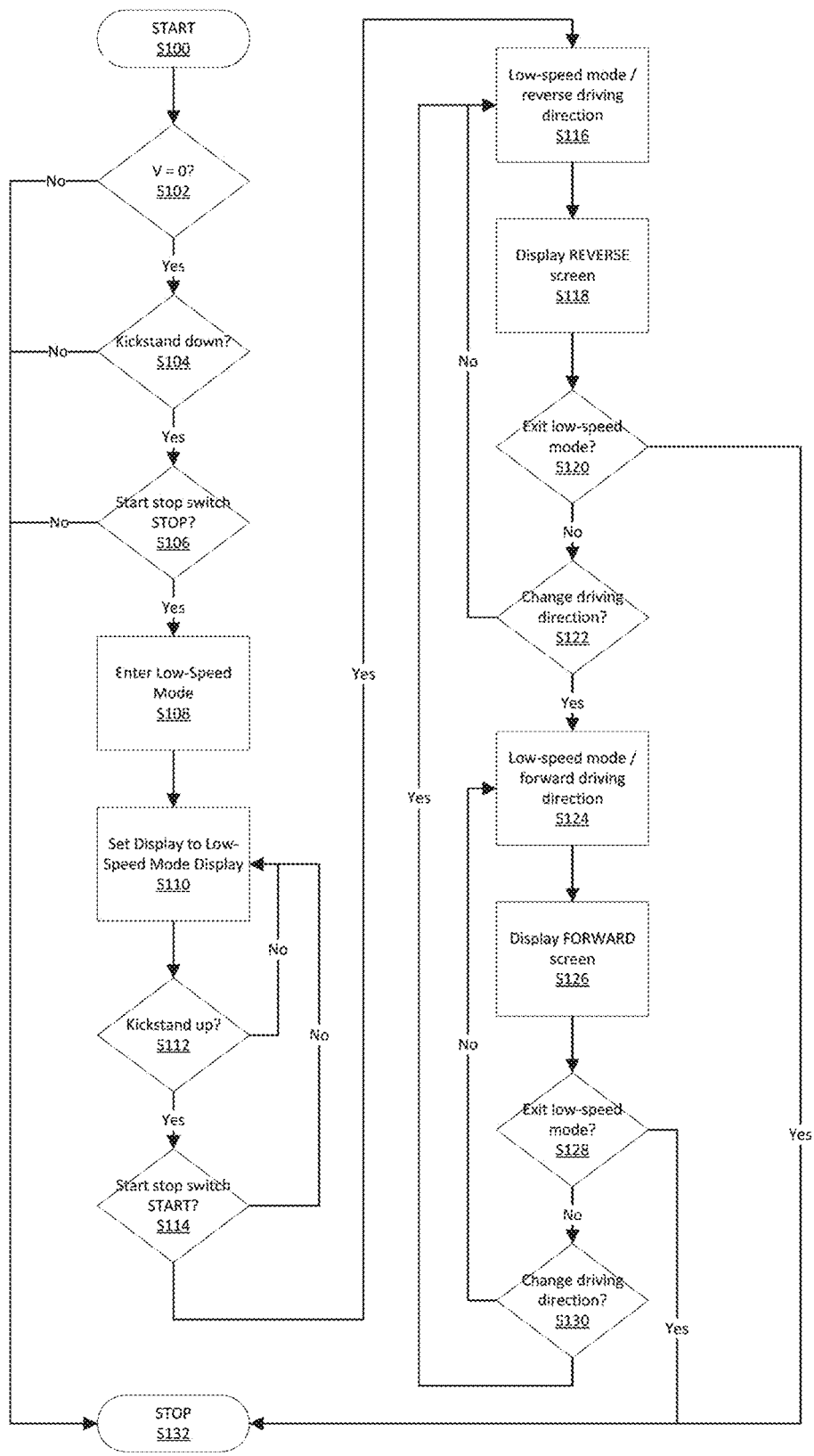
FIG. 8 is a flowchart that schematically illustrates a method of operating a vehicle according to an example embodiment of the present invention.

FIG. 8 is a flowchart that schematically illustrates a method of operating a vehicle, e.g., vehicle 100, according to an example embodiment of the present invention. It should be understood that the method may be performed by controller 130, e.g., by processor 154 performing a set of instructions, e.g., software 156, stored in a non-transitory computer readable storage medium, such as memory 158.

The method starts at S100, while, for example, the vehicle 100 is operating in its normal operating mode, e.g., in a mode other than the low-speed mode.

In order to enter or engage the low-speed mode, the controller 130 makes an initial set of determinations to ascertain whether the vehicle 100 may safely enter the low-speed mode.

For example, at S102, the controller 130 determines whether the vehicle 100 is stationary, e.g., its speed is zero, or at or below a threshold, e.g., the vehicle speed is less than, less than or equal to, or not greater than the maximum vehicle speed of the low-speed mode. The controller 130 may make this determination based on the rotational speed of the motor 108, the position of the throttle 114, the front brake lever 120, and/or the rear brake pedal 148, a vehicle speed sensor, wheel speed sensor(s) at the front wheel 102 and/or the rear wheel 104, etc. In the condition that the vehicle 100 is not stationary or its speed exceeds the threshold, the method stops at S132, otherwise, the method proceeds to S104.

At S104, the controller 130 determines whether the kickstand 136 is in the lowered or extended position and/or whether the kickstand 136 is in the raised or retracted position. For example, the controller 130 makes this determination based on the kickstand sensor 138. In the condition that the kickstand 136 is in the raised or retracted position, or is not in the lowered or extended position, the method stops at S132, otherwise, the method proceeds to S106.

At S106, the controller 130 determines whether the start stop switch 134 is in the STOP position, also referred to as the OFF or KILL position, or is not in the START, also known as the ON or RUN position. In the condition that the stop start switch 134 is in the START position, or is not in the STOP position, the method stops at S132, otherwise, the method proceeds to S108.

At S108, the controller 130 is prepared to enter or engage the low-speed mode. It should be appreciated that the determinations in S102, S104, S106 may be made in the order illustrated in FIG. 8 or may be made in a different order. Moreover, these determinations may be made simultaneously or sequentially. Additionally, it is possible for the controller 130 to ascertain that the vehicle 100 is in a stopped state, in which it is safe to enter or engage the low-speed mode, by making only one of the determinations in S102, S104, S106, only two of the determinations in S102, S104, S106, or all three determinations in S102, S104, S106. The controller 130 may also determine that the vehicle 100 is in a stopped state by evaluating data from a GPS or other navigation system included in the vehicle 100. The controller 130 may also make a determination as to whether a driver or operator of vehicle 100 is present on or at the seat 110 based on a weight or proximity sensor and only permit entry or engagement of the low-speed mode in the condition that the weight or proximity sensor detects the presence of a driver or operator of the vehicle 100.

Once the conditions that permit entry or engagement into the low-speed mode have been met, the low-speed mode may be entered or engaged by navigating the menu structure of the vehicle 100 via the dash display 118 as described above. The method proceeds from S108 to S110.

At S110, the dash display 118 is set to display the low-speed display, such as that illustrated in FIGS. 7b and 7c. Thus, for example, prior to S108, the dash display 118 may display the screen illustrated in FIG. 7a, and between S110 and S132, the dash display 118 may switch to the low-speed display, such as that illustrated in FIGS. 7b and 7c, depending on the driving direction of the vehicle 100. After S110, the method proceeds to S112.

Figure 7D:
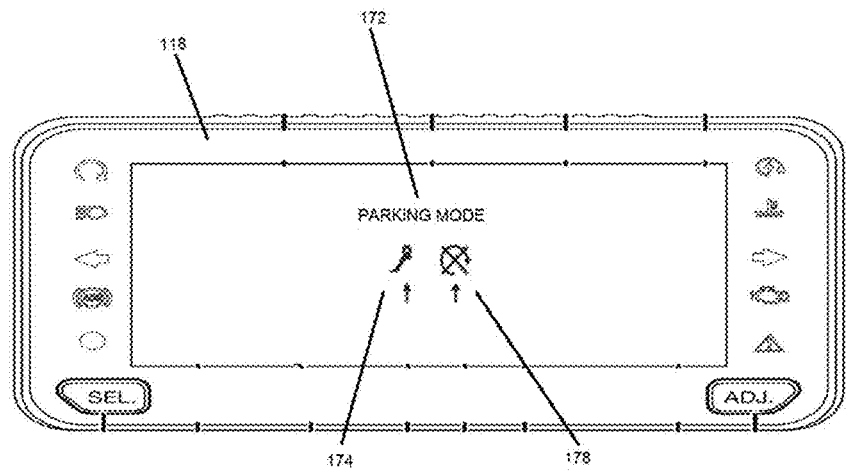

Although the low-speed mode is entered or engaged at S110, the vehicle 100 is prevented from being propelled by the motor 108 until certain conditions are met, as determined, for example, by the controller 130. Thus, rather than initially displaying the screens illustrated in FIGS. 7b and 7c, the dash display 118 may initially display the screen illustrated in 7d upon entering the low-speed mode. As illustrated in FIG. 7d, the dash display 118 provides a textual indication 172 that the low-speed mode has been entered or activated, e.g., by displaying "PARKING MODE" thereon. Additionally, the dash display 118 may provide visual indications 174, 178 of status actions that the driver of the vehicle 100 must take in order to propel the vehicle 100 in the low-speed mode, e.g., by indicating that the kickstand 136 must be raised or retracted, for example, by displaying an icon 174, that the start stop switch 134 must be set to the START position, for example, by displaying another icon 178. After each of these actions are taken, the dash display may turn off the respective icon 174 or 178, such that only remaining actions necessary to propel the vehicle 100 in the low-speed mode are indicated. Once all actions necessary to allow the vehicle 100 to be propelled in the low-speed mode have been take, the dash display 118 may then stop displaying the screen illustrated in FIG. 7*d* and thereafter display the screens illustrated in FIGS. 7*b* and 7*c*, depending on the driving direction of the vehicle 100.

At S112, the controller 130 determines whether the kickstand 136 has been raised or retracted, or is no longer in the lowered or extended position. This determination may be made by the controller 130 based on the kickstand sensor 138. In the condition that the kickstand is in the lowered or extended position, or is not in the raised or retracted position, the vehicle 100 is not propelled, and the vehicle 100 remains in the low-speed mode, otherwise, the method proceeds to S114.

At S114, the controller 130 determines whether the start stop switch 134 is in the START position. In the condition that the start stop switch 134 is in the STOP position, or is not in the START position, the vehicle 110 is not propelled, and the vehicle remains in the low-speed mode, otherwise the method proceeds to S116. It should be appreciated that the determinations S112 and S114 may be made in the order illustrated in FIG. 8 or may be made in the reverse order. Moreover, it is possible that the controller 130 only makes one of these determinations S112 and S114, e.g., only S114.

At S116, the low-speed mode is entered or engaged, and the motor 108 is operated by the driver of the vehicle 100 to propel the vehicle 100 in the reverse direction in accordance with the rotational driving direction of the motor 108. It is alternatively possible that the motor 108 is operated to propel the vehicle 100 in the forward direction upon first entering the low-speed mode. The method proceeds from S116 to S118. The driving direction of the vehicle 100 upon first entering the low-speed mode may be fixed or may be user-definable, e.g., the driving direction upon first entering the low-speed mode may be fixed as the reverse direction, fixed as the forward direction, or selected by the operator. For example, for so-called street bikes, e.g., cruisers, roadsters, touring motorcycles, the driving direction of the vehicle 100 upon first entering the low-speed mode may be set to the reverse direction, e.g., to facilitate parking, to assist the driver in maneuvering in tight spaces or on an incline, etc., whereas, for example, for so-called sport bikes, dirt bikes, etc., the driving direction of the vehicle 100 upon first entering the low-speed mode may be set to the forward direction, e.g., to assist the driver in maneuvering or overcoming obstacles.

At S118, the dash display 118 displays the screen illustrated, for example, in FIG. 7*b*. If, however, the motor 108 is operated to propel the vehicle in the forward direction upon first entering the low-speed mode, the dash display 118 displays the screen illustrated, for example, in FIG. 7*c*. While in the low-speed mode, as mentioned above, the speed of the vehicle 100 is limited, for example, by the controller 130 to, e.g., approximately 3 mph, e.g., between 2.5 and 3.5 mph, between 2 and 4 mph, between 1 and 5 mph, etc. Thus, for example, regardless of throttle position, the controller 130 may limit the rotational speed of the motor 108 so that the speed of the vehicle 100, while in the low-speed mode, does not exceed this low-speed limit. It should be appreciated that the low-speed limit may be fixed, may be variable, and/or may be user-definable.

In certain situations, the operator of the vehicle 100 may set a lower or higher low-speed limit than those mentioned above and/or than a factory-default or factory-set low-speed limit. For example, a lower or higher low-speed limit may be, e.g., permanently, temporarily, etc., set for an indoor demonstration, display, or show, e.g., at a dealership, trade show, exhibit space, test drive, etc., to permit demonstration of operation of the vehicle 100, e.g., in the low-speed mode and/or in the normal operating mode of the vehicle 100, without operating the vehicle 100 in its full power/speed operation. That is, for example, the low-speed mode may not only be utilized for assisting the driver of the vehicle 100 in parking, maneuvering in tight spaces, in overcoming obstacles, etc., but also in training or teaching a driver, e.g., a first-time motorcycle rider, how to drive the vehicle 100, in indoor driving of the vehicle 100, during test drives of the vehicle 100, etc. Additionally, the low-speed limit may be the same in the reverse driving and forward driving directions but may be different.

For example, the low-speed limit in the reverse driving direction may be lower or higher than in the forward driving direction.

The driver of the vehicle 100 may, at their discretion, exit the low-speed mode at any time after entering or engaging the low-speed mode. For example, at S120, it is determined whether to exit the low-speed mode, and, if so, the method stops at S132. Among the actions that indicate the driver's intent to exit the low-speed mode are: lowering the kickstand 136, e.g., based on a signal from the kickstand sensor 138; setting the start stop switch 134 to STOP; turning the key switch 122 to the OFF position; exiting the low-speed mode by navigating through one or more on-screen menus presented on the dash display 118; operating one or more designated control components of the vehicle 100; etc. Thus, the controller 130 may, upon detection of one or more of these events, exit the low-speed mode and stop the method at S132. If the low-speed mode should be maintained, e.g., the low-speed mode should not be exited, the method proceeds to S122.

At S122, it is determined whether the driving direction should be changed, e.g., toggled or switched from the reverse driving direction to the forward driving direction. The operator of the vehicle 100 may change driving directions, for example, by pressing a designated location on the dash display 118, e.g., a touch screen, as mentioned above. Alternatively, the operator may be required to operate one or more of the controls of the vehicle 100. For example, the driving direction while in the low-speed mode may be switched or toggled between the forward and reverse driving directions while simultaneously operating the front brake lever 120, which is provided on the right side of handlebar 112, and another control component provided on the right switchgear 124, e.g., a press of the cruise control switch or button 150 for less than one second, for example. Thus, the driver may quickly and readily toggle between forward and reverse driving directions using the controls on one side of the handlebar 112. Requiring two simultaneous actuations of control components on one side of the handlebar 112 reduces, minimizes, and/or eliminates the risk that the driver of the vehicle 100 would accidentally or unintentionally switch driving directions. Therefore, safety for the driver, pedestrian, the vehicle 100, and other property is improved. In the circumstance that the driving direction is not to be changed, the low-speed mode, in the reverse driving direction, is maintained, otherwise, the method proceeds to S124.

At S124, the low-speed mode is maintained, and the driving direction is switched to the forward driving direction. Additionally, any change in maximum speed is also made, if the maximum speed in the forward direction is different than the maximum speed in the reverse direction. Thus, when propelled by motor 108, the vehicle 100 travels in the forward direction, limited by the controller 130 to the maximum speed of, for example, approximately 3 mph, e.g., between 2.5 and 3.5 mph, between 2 and 4 mph, between 1 and 5 mph, etc. As mentioned above, the maximum speed in the low-speed mode may be the same for the forward and reverse driving directions or may be different for the forward and reverse driving speeds. For example, the low-speed limit in the forward driving direction may be higher or lower than in the reverse driving direction. Thus, for example, regardless of throttle position, the controller 130 may limit the rotational speed of the motor 108 so that the speed of the vehicle 100, while in the low-speed mode, does not exceed this low-speed limit. As noted above, the driving direction is determined by the rotational direction of the motor 108, and reversing the rotational direction of the motor 108 results in reversing the travel direction of the vehicle 100. The method then proceeds to S126.

At S126, the screen displayed on the dash display 118 is switched to the screen illustrated, for example, in FIG. 7c. The method then proceeds to S128.

As mentioned above, the driver of the vehicle 100 may, at their discretion, exit the low-speed mode at any time after entering or engaging the low-speed mode. For example, at S128, it is determined whether to exit the low-speed mode, and, if so, the method stops at S132. Among the actions that indicate the driver's intent to exit the low-speed mode are: lowering the kickstand 136, e.g., based on a signal from the kickstand sensor 138; setting the start stop switch 134 to STOP; turning the key switch 122 to the OFF position; exiting the low-speed mode by navigating through one or more on-screen menus presented on the dash display 118; operating one or more designated control components of the vehicle 100; etc. Thus, the controller 130 may, upon detection of one or more of these events, exit the low-speed mode and stop the method at S132. If the low-speed mode should be maintained, e.g., the low-speed mode should not be exited, the method proceeds to S130.

At S130, it is determined whether the driving direction should be changed, e.g., toggled or switched from the forward driving direction to the reverse driving direction. In the circumstance that the driving direction is not to be changed, the low-speed mode, in the forward driving direction, is maintained, otherwise, the method proceeds to S116.

It should be understood that the actions of the method illustrated in FIG. 8 may be performed in the order illustrated in FIG. 8 or may be performed in different orders. Moreover, the method may include lesser or additional actions. Additionally, the controller 130 may perform some, or all, of the actions, or multiple components of the vehicle 100 may perform the method.

As described above, the dash display 118 may display particular screens while the vehicle 100 is in the low-speed mode, in order to provide an indication to the driver that the low-speed mode is active and the direction of travel of the vehicle 100. To alert pedestrians, drivers of other vehicles, etc., that the vehicle 100 is a low-speed mode, especially since the vehicle 100 is a battery-powered motorcycle that emits substantially low or no sounds, particularly at a standstill or low speed, the controller 130 may cause the brake light 140, the rear turn signal lights 142, the headlight 144, the front turn signal lights 146, the horn, etc., to indicate, e.g., visually, for example, by flashing or blinking, or audibly, that the vehicle 100 is in an active driving mode.

As noted above, in the low-speed mode, the maximum speed is, for example, approximately 3 mph, e.g., between 2.5 and 3.5 mph, between 2 and 4 mph, between 1 and 5 mph, etc., and may be approximately an average person's walking speed. Therefore, in the low-speed mode, the operator of the vehicle 100 should be able to maintain control of the vehicle 100 as though walking the vehicle 100 forward or backward, e.g., to park, maneuver in tight spaces, overcome obstacles on the road or a trail, etc. Since the vehicle 100 is driven by an electric motor 108 powered by a battery 132, or other storage device, it is possible to control, e.g., by controller 130, the torque, power, and speed of the vehicle 100 by controlling the motor 108 and/or power delivered by battery 132 to the motor 108. For example, the controller 130 may control the battery 132 and/or motor 108 so that the motor's maximum torque is available to propel the vehicle 100 forward or backward from a standstill. Therefore, from a standstill, the vehicle 100 may readily overcome an obstacle, static friction among vehicle components and the driving surface, etc. However, to reduce, minimize, and/or eliminate the possibility that the driver loses control of the vehicle 100 in the low-speed mode, e.g., due to the high torque output of the motor 108, the controller 130 may control the battery 132 and/or motor 108 so that motor torque, and/or torque at the wheel(s) 102, 104, is reduced as speed of the vehicle 100 increases toward the maximum speed. Thus, for example, in the low-speed mode, there is an inverse relationship between speed, e.g., speed of the vehicle 100, rotational speed of the motor 108, etc., and torque, e.g., torque output by the motor 108, torque at the driven rear wheel 104, etc. The torque output by the motor 108 may be controlled by the controller 130 by controlling the current, voltage, and/or frequency of electrical energy supplied to motor 108 from battery 132. In the low-speed mode, the controller 130 may control the torque output by the motor 108 and/or the wheel(s) 102, 104 in accordance with a characteristic map stored, e.g., in memory 158, as a stepwise function of speed of the vehicle 100 and/or rotational speed of the motor 108, as an inverse function of speed of the vehicle 100 and/or rotational speed of the motor 108, etc.

In the low-speed mode, the controller 130 may implement, for example, a PI (proportional-integral), a PID (proportional-integral-derivative), etc., feedback control process and/or may be arranged as and/or may include a PI controller, a PID controller, etc. Moreover, the feedback control mechanism may provide, for example, positive torque, to increase the speed of the vehicle 100, in the circumstance that the speed of the vehicle 100 is below the speed limit of the low-speed mode and speed increase and/or torque is demanded by the driver, or negative torque, to slow the speed of the vehicle 100, for example, in the circumstance that the speed of the vehicle 100 exceeds or quickly approaches the speed limit of the low-speed mode.

In an exemplary implementation, the speed limit of the vehicle 100 in the low-speed mode may be proportional to the rotational speed of the motor 108, e.g., measured in RPM of the motor 108. For example, according to a PI control process, a maximum rotational speed $\omega_{max}$ of motor 108 in the low-speed mode may represent a predetermined value and may be stored in memory 158. In a first range, e.g., between a zero speed and a predetermined rotational speed threshold $\omega_1$, which is between zero and $\omega_{max}$ (e.g., $0<\omega_1<\omega_{max}$), the controller 130 may control motor 108 to output its maximum available torque. In a second range, e.g., between the predetermined rotational speed threshold on of the motor 108 and the maximum rotational speed $\omega_{max}$ of the motor 108, the controller 130 may control the motor 108 to reduce its output torque, e.g., according to a linear relationship between, for example, speed and torque, approaching zero torque as the rotational speed of the motor 108 approaches the maximum rotational speed $\omega_{max}$. In the circumstance that the rotational speed of the motor 108 reaches the maximum rotational speed $\omega_{max}$, the output torque of the motor 108 may be reduced to zero, and in the circumstance that the rotational speed of the motor 108 exceeds the maximum rotational speed $\omega_{max}$, e.g., operating the vehicle 100 on an incline, the output torque of the motor 108 may be negative, to decrease the speed of the vehicle 100. The controller 130 may also increase torque output of the motor 108 based on time spent at or near the maximum permitted torque without reaching the maximum rotational speed $\omega_{max}$ of the motor 108. According to the foregoing PI control process, in the circumstance that the driver of the vehicle 100 in the low-speed mode operates the throttle/accelerator of the vehicle 100 to demand high and immediate speed, torque, power, etc., the controller 130 controls the motor 108 so that (1) high torque is output by the motor 108 upon initial acceleration, (2) torque output by the motor 108, and acceleration of the vehicle 100, decreases as the rotational speed of the motor 108 approaches the maximum rotational speed $\omega_{max}$, and (3) torque output by the motor 108 achieves a steady rotational speed of the motor 108 at the maximum rotational speed $\omega_{max}$. The foregoing PI control process may also be implemented to control speed, torque, acceleration of the vehicle 100 based on a setpoint rotational speed that is dependent on the position of the throttle/accelerator. Therefore, for example, the amount of torque available from the motor 108 to propel the vehicle 100 depends on the operating speed of the vehicle 100 and the maximum permitted speed of the vehicle 100, e.g., $\omega_{max}$, and maximum torque from the motor 108 is available to propel the vehicle 100 in the circumstance that the operating speed of the vehicle 100 is significantly lower than the maximum permitted speed of the vehicle 100, e.g., $\omega_{max}$.

It should be appreciated that controller 130 may implement the control of the battery 132 and/or motor 108 so that the inverse relationship between torque and speed is achieved or that controller 130 may communicate with one or more additional controller(s), ECU(s), etc., to achieve that inverse relationship. For example, an additional controller, e.g., arranged as a motor controller integrated with or separate from the motor 108, separate from the controller 130, etc., may control the motor 108 according to the inverse relationship between torque and speed. That is, the additional controller may control the motor 108 so that torque output by the motor 108 is reduced as the speed of the motor 108 increases, e.g., toward an RPM limit of the motor 108. The controller 130 may communicate to the additional controller that the low-speed mode is engaged or activated, for example, by communicating to the additional controller an RPM limit of the motor 108 that corresponds to the maximum speed of the vehicle 100, the maximum rotational speed of the motor 108, etc., of the low-speed mode. The additional controller, therefore, may implement its, e.g., inverse, torque-speed control based on the RPM limit of the motor 108 communicated to the additional controller by the controller 130. In other words, the additional controller may perform a torque-speed control based on an RPM limit of the motor 108, and the controller 130 may communicate, to the additional controller, a low-speed mode RPM limit of the motor 108 so that the additional controller implements its torque-speed control of the motor 108 and/or battery 132 in accordance with the low-speed mode RPM limit communicated to the additional controller by the controller 130.

Additionally or alternatively, the additional controller may be adapted to implement the low-speed mode, so that the controller 130 may communicate to the additional controller that the low-speed mode is engaged or activated, without identifying an RPM limit associated with the low-speed mode, and the additional controller may implement its own low-speed mode control to achieve the inverse torque-speed relationship described above.

While vehicle 100 is described as a two-wheeled vehicle, it should be appreciated that vehicle 100 may be arranged as any type of vehicle having an electric powertrain, including a powersports vehicle, a powered two-wheeler, a utility terrain vehicle (UTV), an all-terrain vehicle (ATV), a three-wheeled vehicle, etc.

What is claimed is:

1. A system for a wheeled vehicle, comprising:
an electric motor adapted to drive at least one wheel of the vehicle to propel the vehicle, the electric motor having a predetermined maximum torque output;
an energy storage device adapted to supply electrical energy to the electric motor; and
a controller adapted to control the supply of electrical energy to the electric motor to control an amount of torque output by the electric motor;
wherein the controller is adapted to selectively operate the vehicle in a low-speed mode to limit a driven speed of the vehicle to a maximum driven speed that is below a maximum speed of the vehicle, the controller adapted to control the amount of torque output by the electric motor in the low-speed mode according to an inverse relationship between the amount of torque output by the electric motor and the driven speed of the vehicle; and
wherein the controller is adapted to control the amount of torque output by the electric motor in the low-speed mode toward the predetermined maximum torque output of the electric motor at a zero vehicle speed and to reduce the amount of torque output by the electric motor in the low-speed mode with increasing vehicle speed.

2. The system according to claim 1, wherein the controller is adapted to selectively propel the vehicle in a forward direction and in a rearward direction in the low-speed mode.

3. The system according to claim 2, wherein the controller is adapted to switch between propulsion of the vehicle in the forward direction and in the rearward direction.

4. The system according to claim 3, further comprising at least one user-operable control component, the controller adapted to switch between propulsion of the vehicle in the forward direction and in the rearward direction in response to operation of the user-operable control component.

5. The system according to claim 4, wherein the user-operable control component includes a front brake lever of the vehicle.

6. The system according to claim 4, wherein the user-operable control component includes a front brake lever located on a right side of a handlebar of the vehicle and a further control component located on the right side of the handlebar of the vehicle, the controller adapted to switch between propulsion of the vehicle in the forward direction and in the rearward direction in response to simultaneous operation of the front brake lever and the further control component.

7. The system according to claim 6, wherein the further control component includes a button and/or a switch.

8. The system according to claim 6, wherein the controller adapted to switch between propulsion of the vehicle in the forward direction and in the rearward direction in response to simultaneous operation of the front brake lever and the further control component for a predetermined length of time.

9. The system according to claim 1, further comprising a display device adapted to display a visual indication that the controller is operating the vehicle in the low-speed mode.

10. The system according to claim 1, wherein the controller is adapted to selectively operate the vehicle in the low-speed mode in response to a predetermined sequence of operation of components of the vehicle.

11. The system according to claim 1, wherein the controller is adapted to prevent activation of the low-speed mode unless a predetermined set of conditions is satisfied.

12. The system according to claim 11, wherein the predetermined set of conditions includes a kickstand of the vehicle being in a lowered position and a speed of the vehicle being zero.

13. The system according to claim 1, wherein the maximum driven speed of the vehicle in the low-speed mode is approximately 3 mph.

14. The system according to claim 1, wherein the controller is adapted to selectively propel the vehicle in a forward direction and in a rearward direction in the low-speed mode by controlling a rotational direction of the electric motor.

15. The system according to claim 1, wherein the electric motor is arranged as three-phase AC motor.

16. The system according to claim 1, wherein the controller is adapted to control the amount of torque output by the electric motor in the low-speed mode by controlling a current, voltage, and/or frequency of the electrical energy supplied to the electric motor from the energy storage device.

17. The system according to claim 1, wherein the energy storage device includes a battery.

18. The system according to claim 17, wherein the battery is arranged as a lithium ion battery.

19. The system according to claim 1, wherein the vehicle is arranged as an electric motorcycle.

20. A two-wheeled vehicle, comprising:
a front wheel;
a rear wheel;
an electric motor adapted to drive at least one of the wheels to propel the vehicle, the electric motor having a predetermined maximum torque output;
a battery adapted to supply electrical energy to the electric motor; and
a controller adapted to control the supply of electrical energy to the electric motor to control an amount of torque output by the electric motor;
wherein the controller is adapted to selectively operate the vehicle in a low-speed mode to limit a driven speed of the vehicle to a maximum driven speed that is below a maximum speed of the vehicle, the controller adapted to control the amount of torque output by the electric motor in the low-speed mode according to an inverse relationship between the amount of torque output by the electric motor and the driven speed of the vehicle; and
wherein the controller is adapted to control the amount of torque output by the electric motor in the low-speed mode toward the predetermined maximum torque output of the electric motor at a zero vehicle speed and to reduce the amount of torque output by the electric motor in the low-speed mode with increasing vehicle speed.

* * * * *